US007010782B2

(12) United States Patent
Narayan et al.

(10) Patent No.: US 7,010,782 B2
(45) Date of Patent: Mar. 7, 2006

(54) INTERACTIVE AUTOMATIC-TEST GUI FOR TESTING DEVICES AND EQUIPMENT USING SHELL-LEVEL, CLI, AND SNMP COMMANDS

(75) Inventors: Purnendu Narayan, Cupertino, CA (US); Dinesh Goradia, Fremont, CA (US); Chirag Nareshkumar Jha, Boynton Beach, FL (US); Ramu Duvur, Sunnyvale, CA (US); Kashinath Mitra, Fremont, CA (US)

(73) Assignee: Sapphire Infotech, Inc., Fremont, CA (US)

( * ) Notice: Subject to any disclaimer, the term of this patent is extended or adjusted under 35 U.S.C. 154(b) by 726 days.

(21) Appl. No.: 10/063,267

(22) Filed: Apr. 4, 2002

(65) Prior Publication Data

US 2003/0191590 A1 Oct. 9, 2003

(51) Int. Cl.
*G06F 9/44* (2006.01)
(52) U.S. Cl. .................. 717/124; 702/118; 709/228
(58) Field of Classification Search ............... 717/125, 717/109, 124; 714/15, 26, 715, 735, 736, 714/738; 709/228; 702/118
See application file for complete search history.

(56) References Cited

U.S. PATENT DOCUMENTS

| 5,390,194 | A |   | 2/1995  | Mannle ..................... 371/27 |
| 5,446,742 | A |   | 8/1995  | Vahabi et al. ................ 371/27 |
| 5,737,518 | A |   | 4/1998  | Grover et al. ......... 395/183.14 |
| 5,790,117 | A |   | 8/1998  | Halviatti et al. ............ 345/333 |
| 5,802,146 | A | * | 9/1998  | Dulman .................... 379/32.03 |
| 5,850,511 | A | * | 12/1998 | Stoecker et al. ............. 714/38 |
| 5,892,947 | A | * | 4/1999  | DeLong et al. ............. 717/100 |
| 5,907,696 | A |   | 5/1999  | Stilwell et al. ............. 395/500 |
| 5,910,895 | A |   | 6/1999  | Proskauer et al. ..... 364/468.28 |
| 5,920,711 | A | * | 7/1999  | Seawright et al. ............ 703/15 |
| 5,982,753 | A |   | 11/1999 | Pendleton et al. .......... 370/252 |
| 6,029,262 | A | * | 2/2000  | Medd et al. ................ 714/724 |
| 6,115,743 | A | * | 9/2000  | Cowan et al. .............. 709/224 |
| 6,128,759 | A |   | 10/2000 | Hansen ..................... 714/738 |
| 6,141,660 | A |   | 10/2000 | Bach et al. ................ 707/103 |
| 6,181,616 | B1 | * | 1/2001  | Byrd ......................... 365/201 |

(Continued)

OTHER PUBLICATIONS

Bae, Seongyong; Bae, Hyunjoo; Cho, Sehyeong; "INAP Cormance Test System Development and Verification Using IUT Simulator", p. 3356-3361, 1998 IEEE, retrieved Mar. 3, 2005.*

(Continued)

*Primary Examiner*—Wei Y. Zhen
*Assistant Examiner*—Mary Steelman
(74) *Attorney, Agent, or Firm*—Stuart T. Auvinen

(57) ABSTRACT

A test manager software program includes an interactive test graphical-user-interface (GUI) for testing network devices using high-level networking commands. The test GUI allows the test engineer user to enter high-level commands such as Simple Networking Management Protocol (SNMP) commands that read values in a management information database in a network device under test. The high-level commands can be sent from the test manager using a command-line interface (CLI) in a telnet session opened to the network device during testing. The user specifies high-level test, analyze, and restore commands in test cases that are collected into test suites. Rules for logging on to the network device under test are stored that include expected prompts from the network device and user responses such as passwords. Addresses of the network device under test can be re-mapped for testing other devices so the test suites can be reused.

20 Claims, 17 Drawing Sheets

```
TEST SUITE
32   TEST CASE A         TEST CASE B         TEST CASE C
     LOGIN               LOGIN
     COMMAND             COMMAND             COMMAND
     ANALYZE             ANALYZE             ANALYZE
     RESTORE             RESTORE             RESTORE
     LOGOUT  37                  38          LOGOUT  39
```

U.S. PATENT DOCUMENTS

| | | | |
|---|---|---|---|
| 6,205,407 B1 * | 3/2001 | Testa et al. | 702/119 |
| 6,272,112 B1 | 8/2001 | Orita | 370/243 |
| 6,338,148 B1 * | 1/2002 | Gillenwater et al. | 714/25 |
| 6,456,306 B1 * | 9/2002 | Chin et al. | 715/810 |
| 6,775,824 B1 * | 8/2004 | Osborne et al. | 717/125 |
| 2001/0012986 A1 | 8/2001 | Conan et al. | |
| 2001/0049594 A1 | 12/2001 | Klevans | |
| 2002/0010908 A1 | 1/2002 | Cheng et al. | |
| 2002/0069399 A1 * | 6/2002 | Miloushey et al. | 717/108 |

OTHER PUBLICATIONS

Lee, Soo-in; Park, Yongbum; Kim, Myungchul; "Automatic Test Case Generation Using Multi-protocol Test Method", p. 360-366, 2000 IEEE, retrieved Mar. 3, 2005.*

Ostrand, Thomas; Anodide, Aaron; Foster, Herbert; Goradia, Tarak; "A Visual Test Development Environment for GUI Systems", p. 82-92, ACM 1998, retrieved Mar. 3, 2005.*

Tufarolo, John; Nielsen, Jeff; Symington, Susan; Weatherly, Richard; Wilson, Annette; Ivers, James; Hyon, Timothy C; "Automated Distributed System Testing: Designing an RTI Verification System", p. 1094-1102, IEEE Dec. 1999, retrieved Mar. 3, 2005.*

Microsoft Computer Dictionary, Fifth Edition, Microsoft Press, 2002, p. 487—definition of SNMP, p. 513—definition of TCP/IP.*

DPS Telecom, "SNMP tutorials", Parts 1-4, 8 pp. Mar. 19, 2002.

Cisco, "SNMP Background" web pp. 1-13, Mar. 19, 2002.

Sprinet Communications, "Sprinet.com magazine" 3 pp and "ScriptCenter" 4pp web pages, Mar. 11, 2002.

Macvittie, L., "CAW's WebReflector Makes Load testing a CakeWalk" Network Computing Mag., 2pp, Mar. 3, 2001.

Eirich & Shipley, "Cisco Cures the Chicago Blues" Network Computing Mag., 9pp, Nov. 12, 2001.

* cited by examiner

```
================================
Test Case Exported : Paris
Dated : 2/18/2002-12:44:23 PM
================================
Interface Values
================================
$IP=172.20.2.3()
Port : 2016
HW   : 805
OS   : RouterOS
================================================================
IPDevice Rules/Prompts And Values
================================================================
RULE : Paris-TS PromptId=0 Prompt=Paris>
RULE : Paris-TS PromptId=0 Prompt=Password:
RULE : Paris-TS-A PromptId=0 Prompt=Paris#
RULE : Paris-TS-A PromptId=0 Prompt=Password:
================================================================
TestCommands
================================================================
TestCommands :sh port 2/43.0
Analyze :sh port 2/43.10.Match
Restore :sh port 2/43.
```

FIG. 5

INTERACTIVE AUTOMATIC-TEST GUI FOR TESTING DEVICES AND EQUIPMENT USING SHELL-LEVEL, CLI, AND SNMP COMMANDS

BACKGROUND OF INVENTION

This invention relates to test software, and more particularly to a graphical-user-interface (GUI) for testing network devices using high-level networking commands.

Electronic systems often carry critical data and thus need to be tested prior to installation and use. Networking equipment or devices such as switches, routers, bridges, etc. are constructed from integrated circuit (IC) chips and boards that are themselves tested prior to installation in a chassis of a networking device. However, the final network device also needs testing before shipment to the end user.

Network devices can be tested by driving binary signals to device inputs, and comparing device outputs to expected outputs, much as IC's are tested. FIG. 1 shows testing of a network device using binary test vectors. A test machine includes input drivers 12 that drive binary signals onto the inputs to network device under test 10. The binary signals are read from stimuli file 16, which is composed ahead of time by a test engineer. The outputs from network device under test 10 are compared to expected outputs in expected outputs file 18 by comparator 14. When an output mismatches the expected output, comparator 14 signals a failure of network device under test 10.

Generating stimuli file 16 and expected outputs file 18 can be tedious and time-consuming. For IC testing and design, various test software programs are available to ease the process of developing the binary input and results files. However, these programs generally operate with low-level binary signals, such as 1's and 0's, or buses of many such binary signals.

Networking devices are usually quite complex. To simplify understanding, such devices can be considered to operate on higher-level packets of data, and respond to higher-level commands, such as commands embedded inside packets. Various higher-level languages have been developed to aid in testing of network devices. Such languages include TCL/TK. TCL is a Tool Command Language, while TK is Toolkit with a graphical user interface.

Network devices are often managed after installation in an operating network. FIG. 2 shows management of network devices installed in an operating network. A network administrator operates a network management program on console 20. Console 20 is coupled to network devices 22, 24, 26 that can include network switches, servers, and routers, as well as other kinds of IP-addressable network devices. These network devices 22, 24, 26 are connected together and to other devices (not shown) by network cables or lines, or perhaps by wireless or other links. Data is passed over these links in packet form. Packets pass over these links among network devices 22, 24, 26 to route these packets from their sources to their destinations on the network or on external networks such as the Internet.

Network devices 22, 24, 26 can be designed to ease management by including management agents 23, 25, 27 inside the device. Management agents 23, 25, 27 each include a management information database (MIB) that includes operating statistics of that device, such as error counters of dropped packets, timers, traffic counters, even temperature and voltage readings. Management software on console 20 can periodically read such operating statistics from agents 23, 25, 27 and signal an alarm to the network administrator when a reading is outside of a desired range, such as when a temperature rises above a limit (perhaps due to a broken fan or a covered vent), or traffic drops below a limit or errors rise above a limit (broken link cable or upstream router down).

Since network devices 22, 24, 26 may be made by different manufacturers, a standard has been developed for such management agents and management information databases. The Simple Networking Management Protocol (SNMP) is a protocol used for network management of various devices. SNMP also includes a set of commands which can be understood by the devices. High-level commands (SNMP commands) can be sent from console 20 to agents 23, 25, 27. These SNMP commands include commands to get (read) a particular statistic from a device, to set operating values or limits in a router/switch, and to trap or perform some task, such as notify the console when a particular event occurs such as a limit being exceeded.

The network administrator can manually enter SNMP commands using a command-line interface (CLI) on console 20, or management software on console 20 (or some other location) can send these commands.

A newly-manufactured network device could be tested prior to shipment by inserting it into a network at the test facility. The test engineer could manually enter SNMP commands from a console to test operating of the network device. These commands could be saved into a script file that is later re-played for each new network device inserted into the test-facility network for testing. However, manual testing can be tedious and prone to errors. Each new network device tested has a different range of network addresses assigned to it, and the script files have to be edited to insert the new network addresses for each network device tested.

What is desired is test software for testing network devices including routers and switches. Test software that accepts high-level commands to test the network device from a test engineer is desired, rather than requiring the test engineer to specify test vectors using low-level binary data. A graphical user interface for such test software is desirable. Networking-equipment test software that accepts high-level network commands such as SNMP commands using a CLI is desired. A test-automation software tool that accepts shell level commands such as SNMP, CLI and Man-Machine-Language (MML) is desired.

BRIEF DESCRIPTION OF DRAWINGS

FIG. 5 shows a test-case listing.

DETAILED DESCRIPTION

The present invention relates to an improvement in networking test software. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
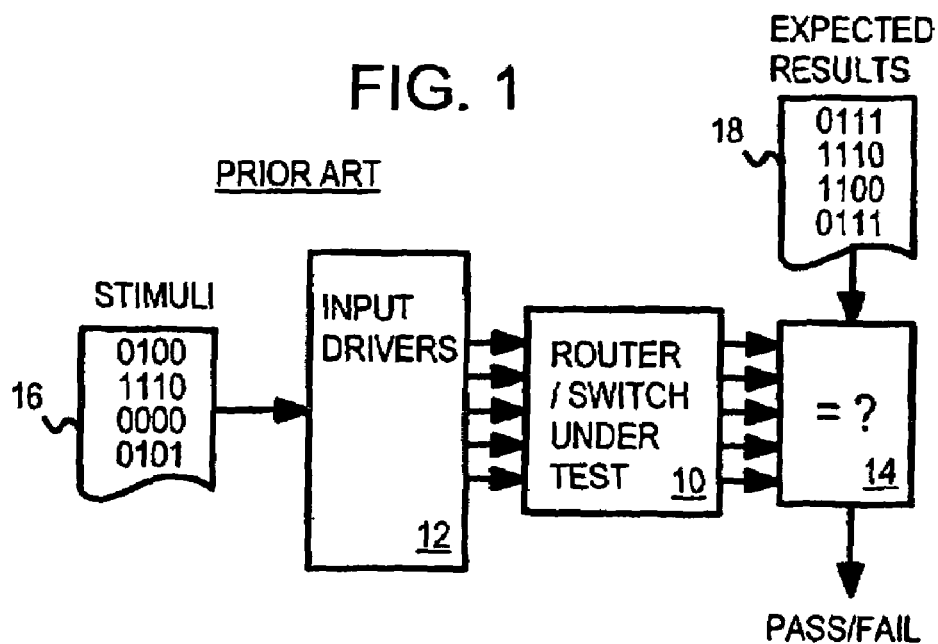
FIG. 1 shows testing of a network device using binary test vectors.
Figure 2:
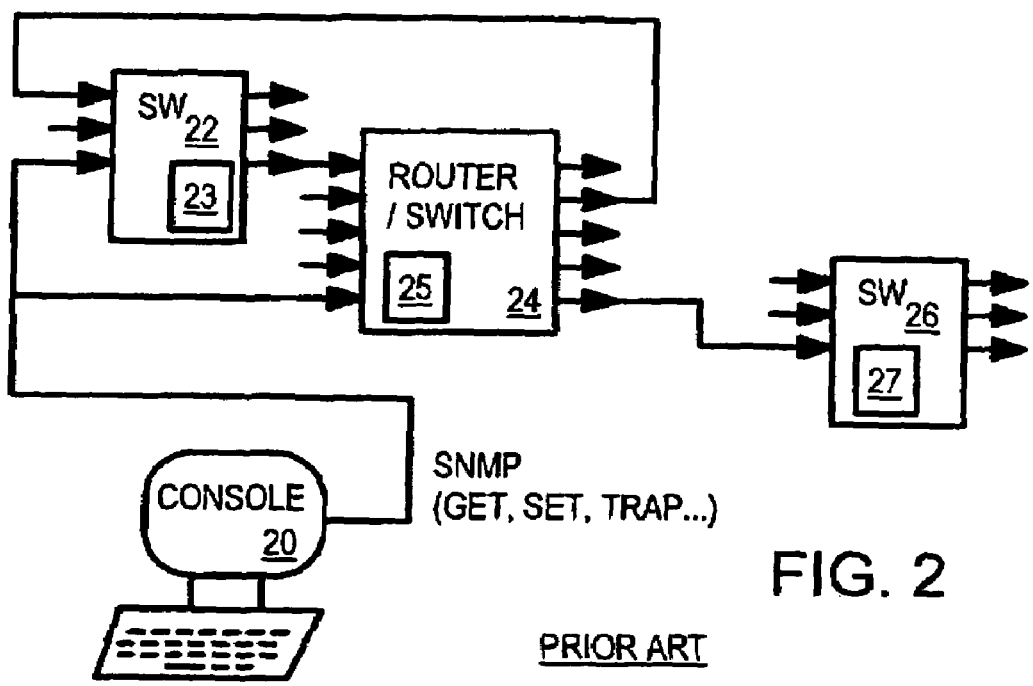
FIG. 2 shows management of network devices installed in an operating network.
Figure 3:
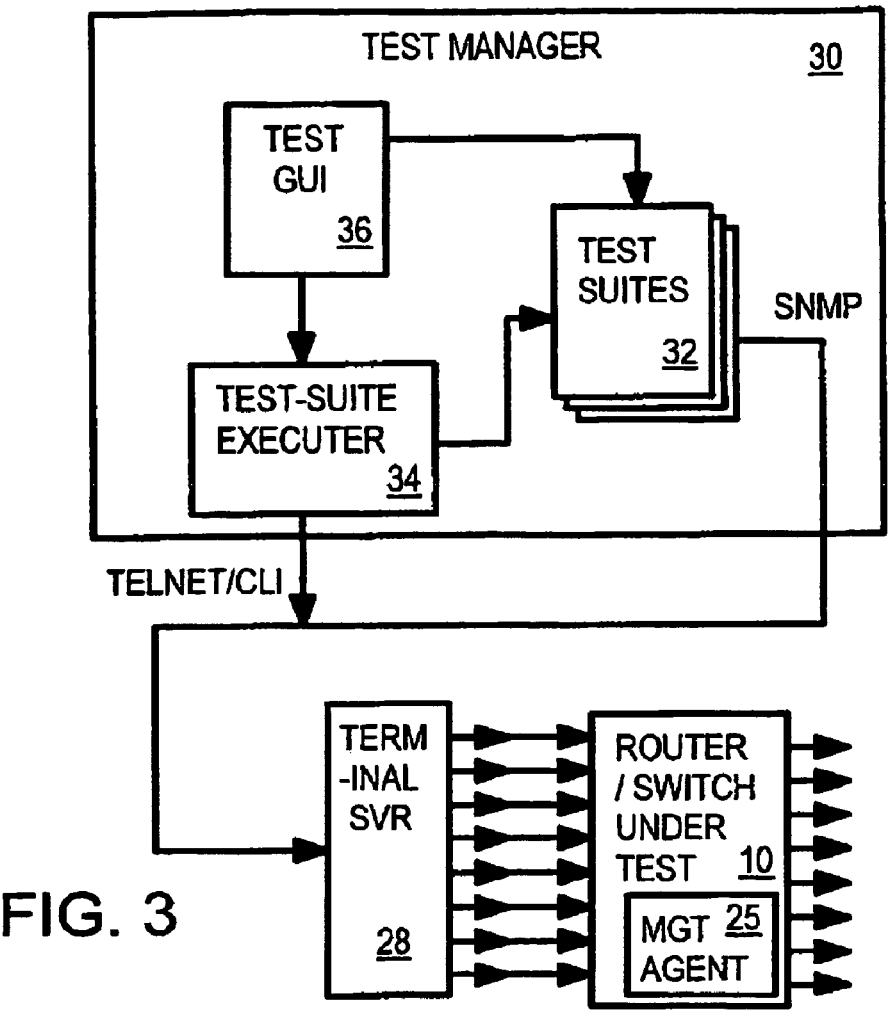
FIG. 3 is a block diagram of a test manager that tests a network device using high-level commands inputted by a user to a test GUI.

FIG. 3 is a block diagram of a test manager that tests a network device using high-level commands inputted by a user to a test GUI. Test manager 30 is an expert-system software program that a test engineer operates. Test manager 30 can be executed locally or remotely from the network device under test, such as on a workstation or personal computer connected to the network device under test.

Instead of manually entering shell-level, command-line-interface (CLI), SNMP, or other high-level commands directly to the network device being tested, the test engineer inputs the high-level commands to test GUI 36. Simple Networking Management Protocol (SNMP) commands can also be entered interactively with a CLI provided by test GUI 36. These shell-level or high-level commands are assembled into test cases and then into test suites 32.

The test engineer can run the assembled test suites 32 by activating test-suite executer 34 from test GUI 36. Test-suite executer 34 reads one or more selected test suites 32 for a network address to send the high-level commands to. The commands from test suites 32 are then sent over a network to the specified network address or addresses. Test-suite executer 34 can open a telnet session to the specified network address and then send the high-level commands from test suites 32 to the specified address.

The network address specified could be an address of a port of the network device under test 10. A series of addresses of ports to network device under test 10 could also be specified rather than just one address, allowing several ports to be tested in parallel.

To access network device under test 10 when device 10 is on another network than test manager 30, terminal server 28 can be used. Test manager 30 sends the high-level commands to terminal server 28. Terminal server 28 then sends the commands to network device under test 10.

The high-level commands from test manager 30 can include SNMP commands that read (get) or write (set) values in the management information database in management agent 25 inside network device under test 10. Errors can be detected internally by hardware or software running on network device under test 10. Such detected errors set flags or registers in the internal management information database. Test manager 30 can determine when such errors are detected by accessing the management information database using SNMP commands to management agent 25.

Test executer 34 can re-map the network addresses that the commands from test suites 32 are sent to, allowing the same test suites to be applied to other network devices under test 10. This is especially useful when terminal server 28 is not used but network device under test 10 is tested directly by test manager 30.

Figure 4:
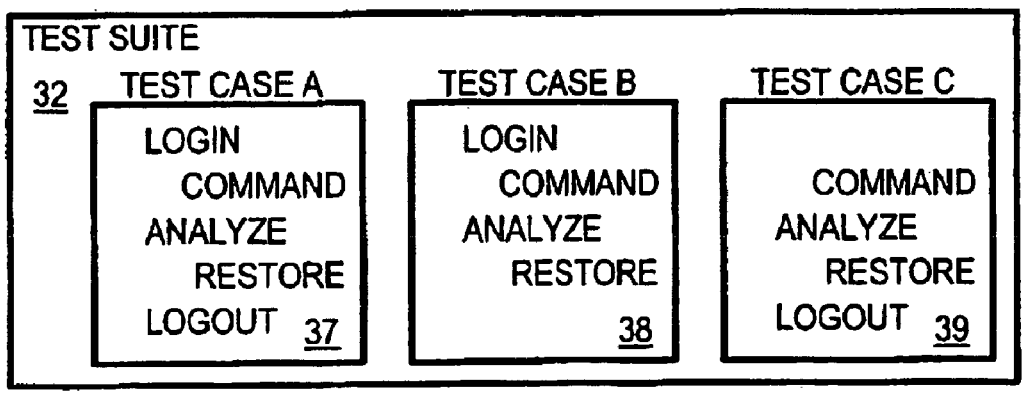
FIG. 4 illustrates that a test suite can be constructed from several test cases.

FIG. 4 illustrates that a test suite can be constructed from several test cases. Test suite 32 is a collection of several lower-level test cases 37–39. Each test case 37–39 can include a login to the network device or a login to the terminal server, one or more high-level commands, a specification of how to analyze results of the command(s), commands to restore the network device, and a logout.

Not all of these components are needed for each test case. For example, test case 38 has a logon but no logout, while test case 39 has no logon but does have a logout. Test case 39 could be executed immediately after test case 38, so no logon is needed for test case 39.

For example, the CLI test command "sh port 2/43" sets the configuration of port 2.43 to a default mode. Then an analyze command "sh port 2/43 10 match" reads the configuration of port 2.43, and compares the configuration read to "10", and signals a failure if the configuration is not 10. For example, the configuration could be the number of mega-bits per second (mbps) of the port, and could be configured for 10, 100, or other values. Finally the restore command "sh port 2/43" resets the configuration of port 2.43 to the default.

FIG. 5 shows a test-case listing. After an identification and timestamp section, the interface to the network device under test is specified. The Internet Protocol (IP) address and port of the network device under test is specified. The hardware of the network device can be specified, such as its model number. The operating system of the network device can also be specified.

The rules section is useful for logging onto the network device under test. Prompts expected from the network device under test are stored, such as the prompt to enter the username, "PARIS>", and the prompt to enter the password, "PASSWORD:". When the test manager receives one of these prompts from the network device under test, the test manager returns the username or password to the network device under test. The username and password are stored in a separate secure storage area or can be stored in a unified database with other data such as test cases and rules definitions.

The rules can include prompts for different privilege levels of the network device under test. For example, the ">" prompt can be for a low-security console/telnet logon level while the "#" prompt can indicate a higher-security supervisor level such as an enable mode logon.

The last section lists the high-level test commands that are sent to the network device under test once the test manager has successfully logged on to the desired security level of the network device under test using the specified rules. The test command "sh port 2/43.0" is a command to show the configuration of port 2/43. An analyze command reads the port's configuration and looks for a match with the number "10" in the configuration and status data returned from the network device. Finally the restore command resets the port's configuration to the default, such as 10 or 100 mbps speed.

Figure 6:
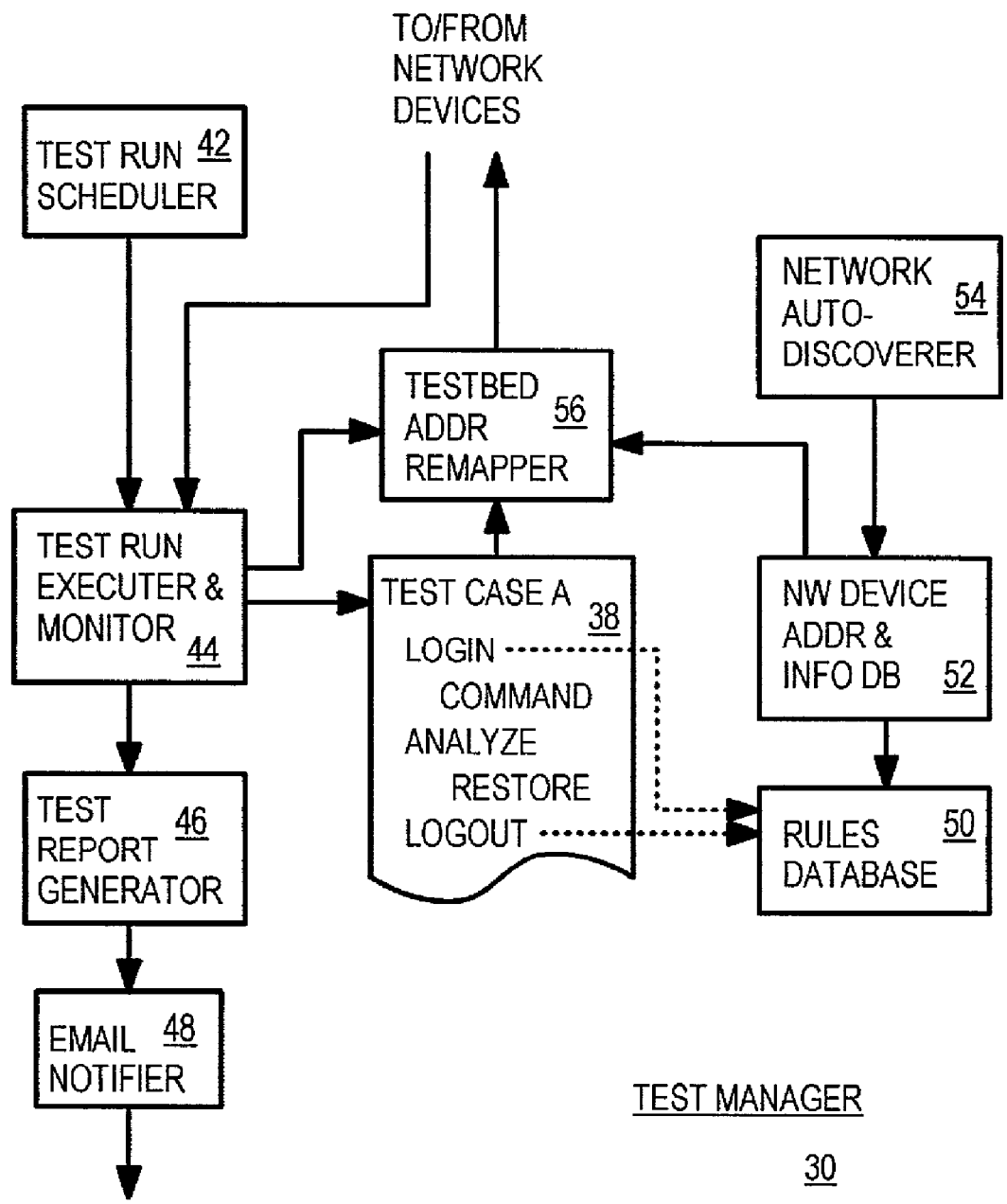
FIG. 6 shows components of the test manager software.

FIG. 6 shows components of the test manager software. The test engineer (user) specifies high-level commands in test case 38 using the test GUI. Network auto-discoverer 54 can be activated by the user to detect network addresses for all devices on the local test network that includes the network device under test. The network addresses, such as IP addresses of all detected devices can be stored in network device database 52, along with other information detected such as an object identifier, system up-time, and system contact details.

Rules can be specified for each network device under test. For example, the expected prompts for logon and logout and the responses can be stored in rules database 50 for some or all network devices in network device database 52. The username and password that test manager 30 responds with can be stored in a secure storage area (not shown). Rules database 50 can include a pointer or other link to the corresponding username and password data in the secure storage, or all the data can be stored in a single database.

Once the commands, rules, and network addresses are specified, the user schedules a time to run test case 38 using test-run scheduler 42. At the scheduled time, test-run executer and monitor 44 is activated by test manager 30. The network address of the network device under test from test case 38 can optionally be remapped to another address by testbed address re-mapper 56 so that the commands can be redirected to a different network device under test from network device database 52.

Test manager 30 can first logon to the network device under test by accessing rules in rule database 50 that are linked to a logon command in test case 38. Once the username and password have been sent to the network device under test from test manager 30, the high-level commands specified in test case 38 can be transmitted to the network device under test.

A results-analyze command can be executed to determine if the commands were successfully executed by the network device under test. The results identified by the analyze command can be written to a results file by test report generator 46 when activated by test-run executer and monitor 44. This test report can be displayed to the user using the test GUI, or the test report can be e-mailed to the user with email notifier 48.

One or more restore commands can then be sent to the network device under test. The restore commands can restore the network device to the initial state before the tests were run. Restoring the network device may require resetting flags or counters, and over-writing values in the management information database in the network device under test. This can restore the network device under test to a known state before the next test case is executed. Test case 38 can also include a logout command to terminate the session with the network device under test.

Figure 7A:
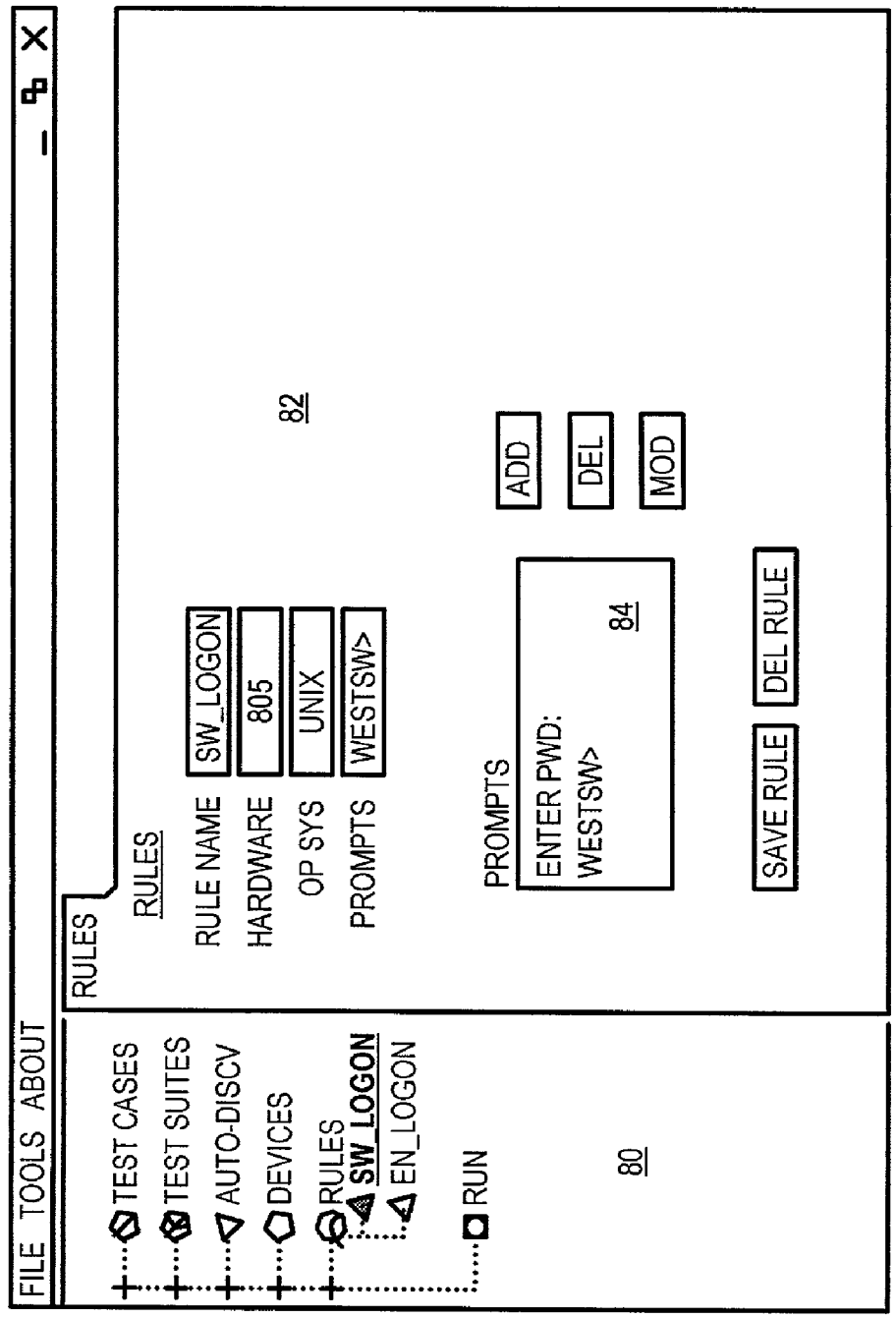
FIG. 7A shows a rules-entering tab in the test GUI.
Figure 7B:
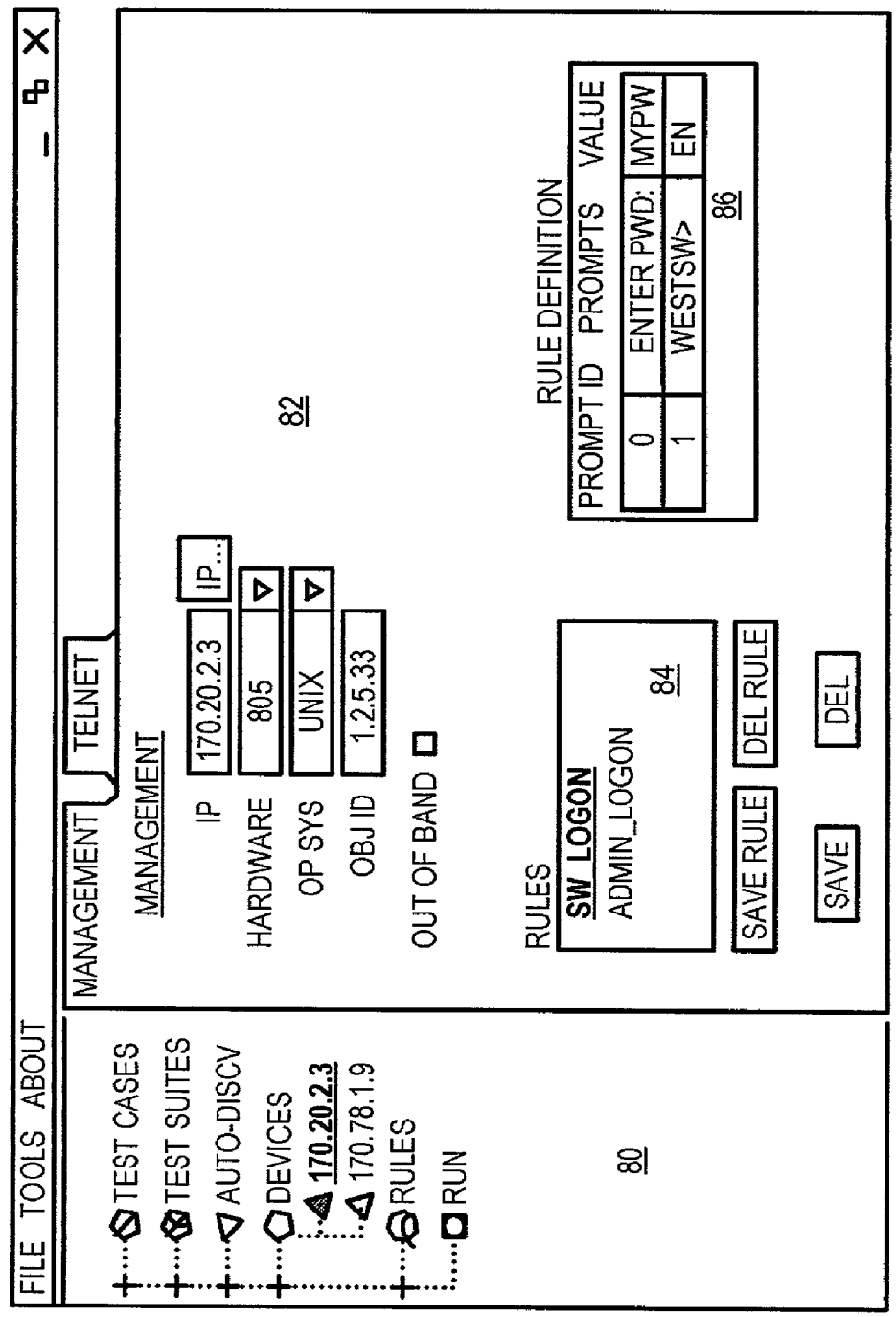
FIG. 7B shows a device-management tab in the test GUI.

Device-Rules User Interface—FIGS. 7A–B

FIG. 7A shows a rules-entering tab in the test GUI. In this example, the test GUI is shown for a Windows operating system (OS) environment. The test GUI can use Windows graphical elements and API's to draw various parts of the user interface to a display screen. For example, a menu bar at the top of the test manager window can include menu selections for "file", "tools", and "about", and other menu choices such as "help" and "edit" may be available at times. Standard Windows controls such as close, resize, maximize, and minimize commands can be included on or above the menu bar, such as in the upper-left corner. These Windows-standard controls and menus can be common to most or all parts of the test GUI.

Tree-view area 80 appears on the left side of the main window area of the test GUI, although this may be customizable to other locations in some variations of the test software. Tree-view area 80 shows a directory-tree-like expandable/collapsible list of sections of the test GUI. For example, several test suites can be seen by clicking on the test suites node, or a list of test cases can be seen by clicking on the test case node.

The user has previously clicked on the auto-discovery tab and performed a search for all network devices on the local node. The network devices found during auto-discovery are listed under the devices node in FIG. 7B. Auto-discovery can be performed by broadcasting SNMP strings that cause management agents to respond with their IP addresses and other information.

The user then clicks on the rules node to enter logon prompts for the selected network device. A series of logon prompts from a network device is defined by rules. The rules tab becomes active tab 82 shown in FIG. 7A.

The user defines rules by entering a rule name, hardware and O/S information, and a prompt from the network device being tested, and clicking on the "Add Rule" button. The prompt then is added to the list of prompts in list box 84. In this example, the prompt "WESTSW>" has just been added.

The hardware field can be used to specify the model number for the network device, while the operating system of the switch can be entered in the OS field. The IP address of the rule links the rule to a network device.

The user types in "enter password" in the prompt box and presses the add button. Then the user types in "WESTSW>" and again presses the add button to the right of list box 84, and "WESTSW>" appears as the second line in list box 84. The user can then click on the save-rule button to save the rule SW_LOGON.

This process can be repeated to create EN_LOGON, entering the enable-level prompts "enter supervisor password" and "WESTSW#". A rule can be deleted by clicking on the delete-rule button, and prompts can be modified or deleted by clicking on the prompt in list box 84 and then pressing the modify or delete button to the right of list box 84.

Rules can be defined for each level of logon to a network device. For example, the first login may be to a telnet/console level, which is followed by a second logon to an enable mode where the user is granted supervisor-level privileges. The second logon can be activated by typing in "en" after the first logon is complete. In this example, SW_LOGON is the first logon to the console level, while EN_LOGON is the second logon to the enable level. Vendor-specific commands can be included in the rules.

As an example, the following sequence of prompts from the network device and user responses logs on to the enable level of the WESTSW device. The test manager first sends a telnet request that contains the username to the network device. The network device responds with the sequence:

User Access Verification
enter password: xxxx
WESTSW>en
enter supervisor password: xxxx
WESTSW#

The user typically enters the two passwords ("xxxx") when prompted, and also enters the command "en" to logon to the enable (supervisor) level. These user-response values are defined later as shown in FIG. 7B. The supervisor level is indicated by the "#" prompt ending rather than the ">" prompt ending. Of course, the prompts and commands used can vary with the manufacturer of the network device and operating system. For example, a Foundry Networks switch might have a prompt "Please Enter Password:", followed by "telnet@seattle>", and when the user enters "value=en", the enable-mode prompt "Password:" is generated, followed by "telnet@seattle#". The switch's name "seattle" may be different for each switch tested.

FIG. 7B shows a device-management tab in the test GUI. After these rules are entered, the user can click on the device node and the window shown in FIG. 7B appears. In tree-view area 80, the user has clicked on the devices node, which exposes two network devices identified by their IP addresses. The upper device, 170.20.2.3, has been selected by the user and is highlighted.

The user can click on the telnet tab and a console window appears, allowing the user to manually logon to the network device. The telnet console window allows the user to double-check the prompts displayed by the network device and user-inputted values when creating rules.

When the user clicks on the management tab at the top, the management tab becomes active tab 82 as shown. The user types in the IP address in the IP address box, or clicks on the "IP . . . " button next to the box and selects an IP address from a pop-up list of discovered IP addresses. The user may alternately select an IP address node from the nodes listed under the devices node in tree-view area 80.

The user then selects the hardware using a drop-down list (not shown) that appears when the down arrow to the right of the hardware field is pressed. When the hardware is selected, the rules associated with this hardware are displayed in list box 84. These rules, SW_LOGON and EN_LOGON, were defined using the rules tab of FIG. 7A.

The operating system is also selected from a drop-down list. The object ID is automatically assigned by the test manager, or can be entered by the user. The "out of band" box is checked when the network device under test is accessed through a terminal server. Then additional boxes appear to the right to allow the user to enter the terminal server's IP address, port used by the test manager to access the network device under test, and the host name of the network device under test. The host name is for the user's reference only. When out-of-band is unchecked, the test manager connects directly with the network device under test.

When the user double-clicks on one of the rules displayed in list box 84, the rule's prompts or definition appear in active sub-tab 86. Each row of active sub-tab 86 displays a prompt identifier that identifies the sequence of the prompts, the prompt from the network device under test, and the value the user typically enters, such as the password or the "en" command to logon to the enable mode level. The prompt ID can be automatically generated by the test manager by incrementing the previous prompt ID, or the user can change these ID's to change the order of the rows of prompts. The user can save the rule's prompts and values by clicking on the save-rule button, or the rule can be deleted with the delete-rule button.

The user can then double-click on the second rule, EN_LOGON, and enter values (user responses) to each prompt. The prompt ID for the first row of the second rule, EN_LOGON, should be changed to the number that follows the last prompt ID in the first rule, SW_LOGON. The save button at the bottom is pressed to save the association of the rules with the device, while the delete button clears the device.

The prompts for a particular network device under test can be modified by the testbed address re-mapper to allow other devices to be tested. For example, the device name "WESTSW" could be substituted with "EASTSW" for another device being tested, and its IP address could also be changed. The prompts can be replaced with parameters by the test manager, which can pass the parameters to the testbed address-remapper which replaces the parameter with a value that depends on the network device currently being tested.

Test-Case Interfaces—FIGS. 8–12

Figure 8:
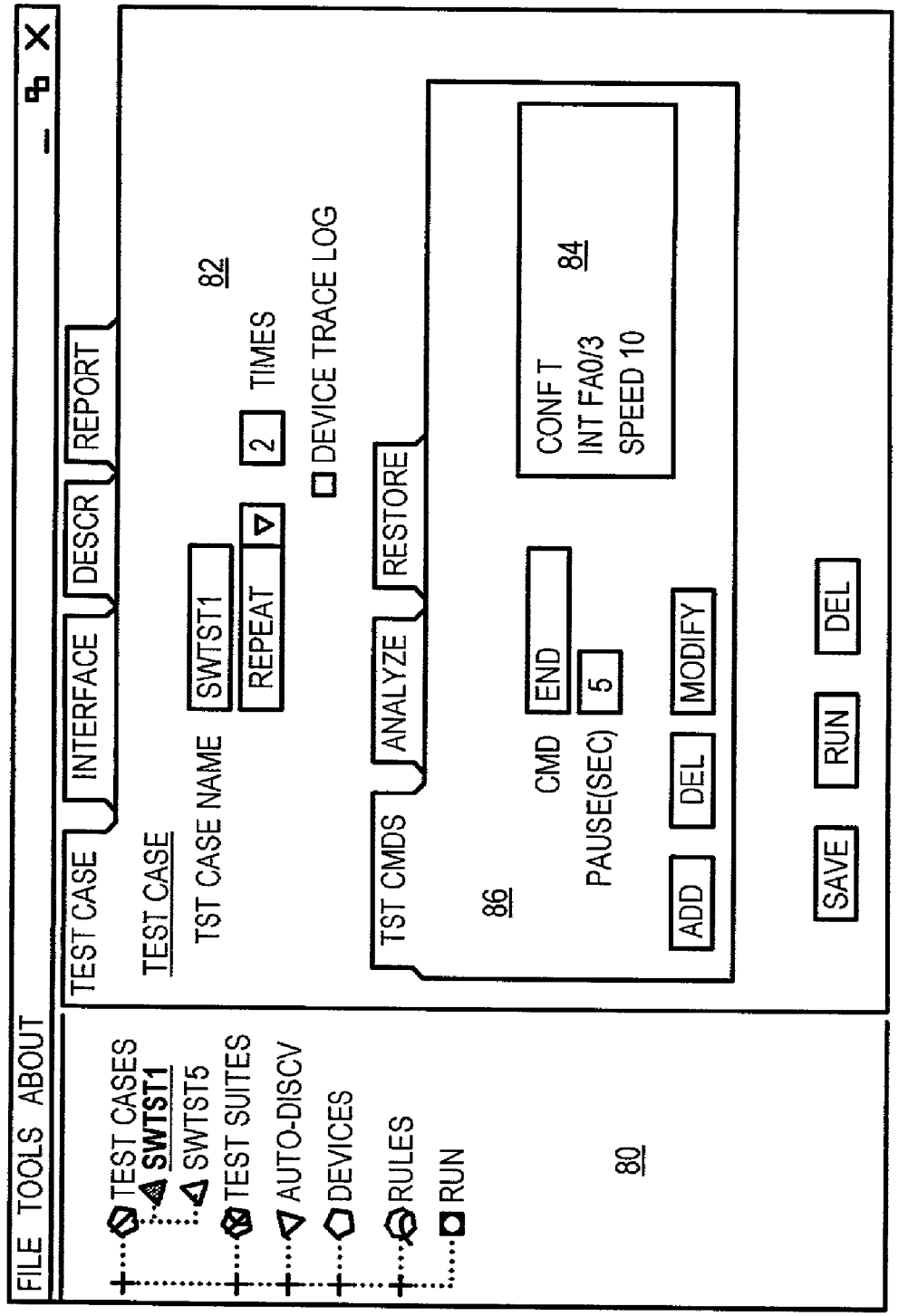
FIG. 8 shows a test interface for entering high-level commands in a test case.

FIG. 8 shows a test interface for entering high-level commands in a test case. The user clicks on the test cases node in tree-view area 80. Alternately the tools menu can be used, or a shortcut key combination can be used to jump to the test cases interface. Test cases are created to run high-level test commands on the network device under test.

A name for the test case is entered in the top box in active tab 82. By using the drop-down box to select a condition, the repeat box can have the values repeat, loop until error, loop until success. The number of times to repeat the command can be entered in the adjoining box. The device trace log box is checked to have a device trace logged for this particular test case to the results file for more detailed debugging.

The commands sub-tab has been selected as active sub-tab 86. The high-level command is entered in the CMD box, and an amount of time in seconds to wait before executing the command may be entered into the pause box. When the add button is clicked, the command is added to the list of commands in list box 84. Existing commands in list box 84 can be selected and deleted or modified using the buttons in active sub-tab 86. The test case can be saved, deleted, or run (commands sent to the network device under test) using the buttons on the bottom of active tab 82. The test case SWTST1 appears as a node under test cases in tree-view area 80 once saved.

The commands entered can be SNMP commands such as get, trace, set that read or write values in the management information database in the management agent inside the network device under test. For example, the SNMP set command "set snmp-server community string read-only public" could be entered in the CMD box to write-protect SNMP data. The commands can also be telnet and CLI commands such as "sh int e0" which is a vendor-specific command that reads (show) parameters for interface e0.

In the example shown, the commands "conf t", "int fa0/3", "speed 10", and "end" are entered, one at a time, in the CMD box, to create a 4-command sequence that configures a port to the lower 10 Mbits-per-second (mbps) speed.

Figure 9:
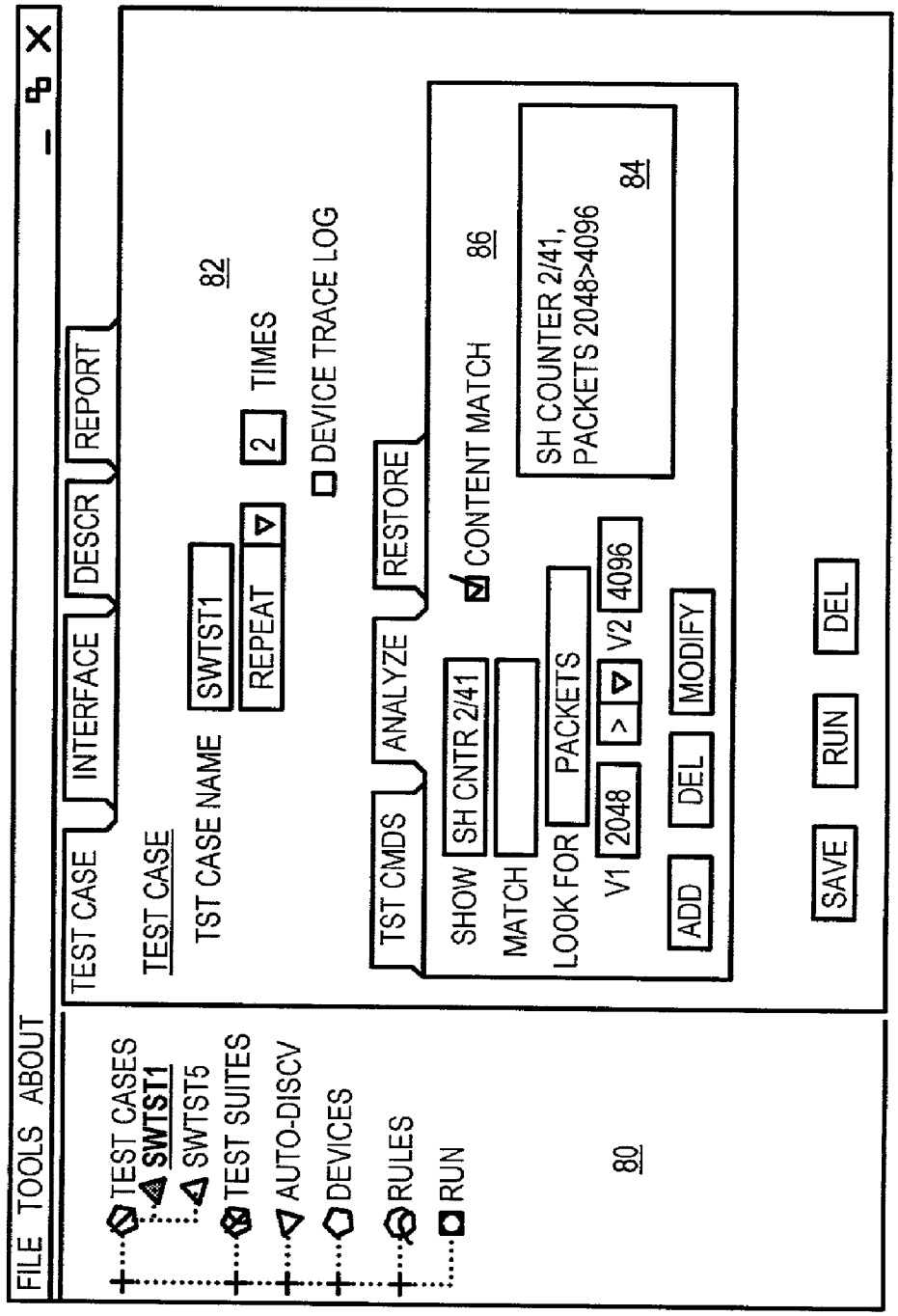
FIG. 9 shows an interface for specifying analysis of results from executing a test command.

FIG. 9 shows an interface for specifying analysis of results from executing a test command. When the user clicks on the analysis sub-tab, it becomes active sub-tab 86. To detect errors, content matching can be performed on packets from the network device under test, or error flags and counters in the management information database can be read using the SNMP get command and compared to expected values.

The analyze command is typed into the show box. The analyze command is one of the commands executed from the command window of FIG. 8. In this example, the analyze command sh cntr 2/41 is a command to show the contents of counters for port 2.41 in the management or configuration information database of the network device under test.

When no match is checked, content matching is not performed. Instead, the results are analyzed by the show-match command itself.

When the content match checkbox is checked, the string typed into the look for box is compared to the string read from the counter by the show int e0 command. The analyze command can compare numeric or string values.

Only packets with these sequence or packet numbers have their contents compared. The packet numbers can be found by running a command specific to that port. The results of the command are compared by the test manager after the analyze command is executed on the network device.

Up to two variables can be typed in to the V1 and V2 fields. An operator such as >, <, =, etc. can be selected from a drop-down list to specify a formula, such as V1>V2. When a packet is found that violates the formula (V1 is equal to or less than V2 in this example), then an error is signaled. For example, input and output byte sizes can be compared as variables V1, V2.

The full analyze command that is sent to the network device under test is displayed in list box 84. The test manager connects to the network device using a telnet session and send the analyze command to the network device. The network device executes the analyze command and performs the comparisons itself, reporting the results of the comparisons back to the test manager.

The analyze conditions are added to the test case by clicking on the add button on active sub-tab 86, while another analyze condition can be selected and modified or deleted using the buttons on active sub-tab 86. Test-case save, delete, and run buttons are found on the bottom of active tab 82.

To test that a "speed 10" command was properly executed, the analyze command "sh int fa0/3" could be entered in the show box. This show command shows all configured parameters for port 0.3. In the match field, "speed 10" would be entered. The network device runs the analyze command sh int fa0/3, causing the parameters to be sent back to the test manager. The test manager then finds the speed parameter in the configuration data returned from the network device under test, and signals an error if the speed value is not 10. For other network devices, the command "speed 10-full 0" might be used, with the analyze command "sh int e24 Configured Speed 10 Mbit Match" being used to test for a matching string from the network device of "Configured Speed 10 Mbit" that is returned by the show (sh) command.

Figure 10:
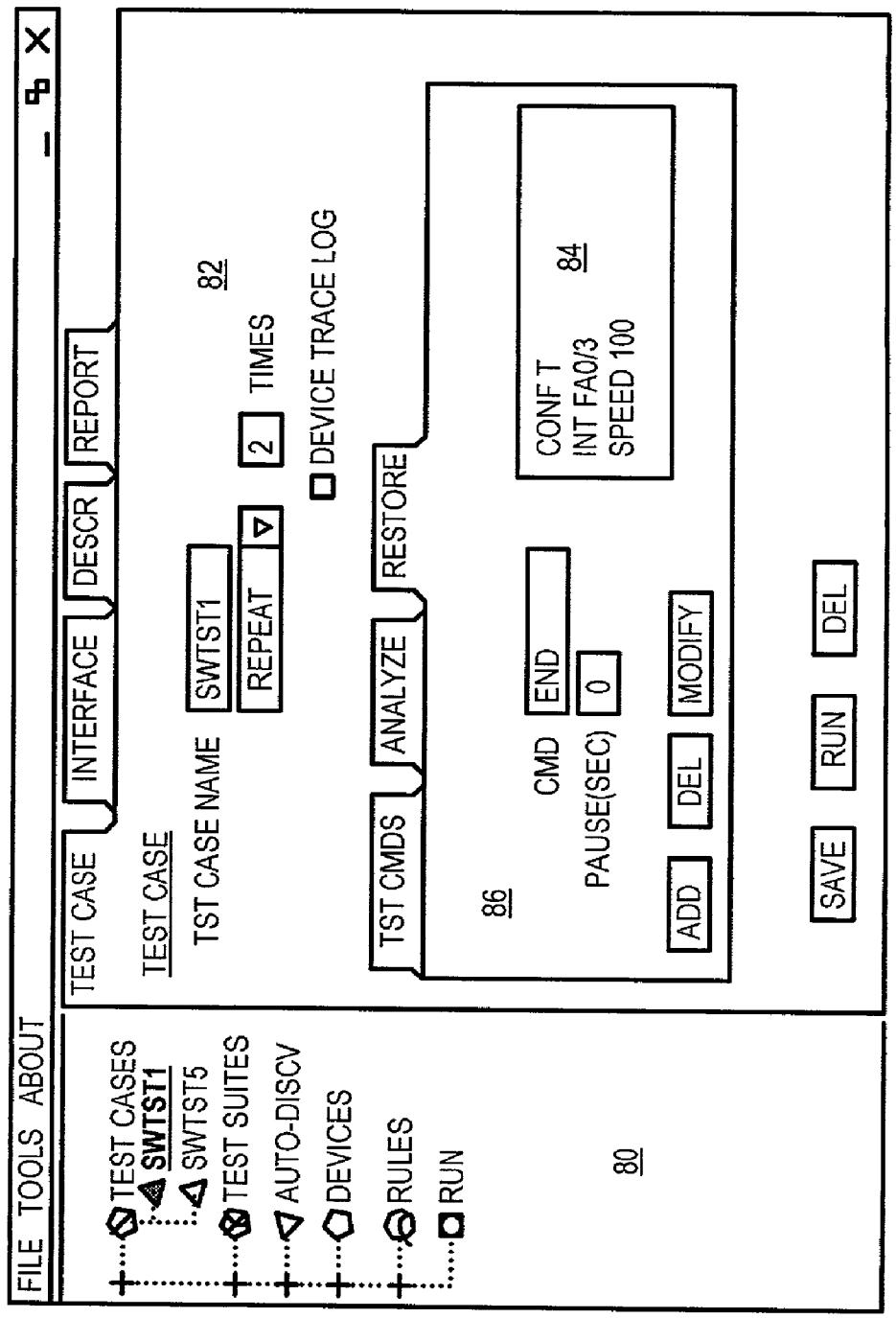
FIG. 10 shows an interface to specify a restore command for restoring the network device under test after a test command is executed and analyzed.

FIG. 10 shows an interface to specify a restore command for restoring the network device under test after a test command is executed and analyzed. The user can click on the restore sub-tab to enter a restore command into active sub-tab 86. A restore command can be entered into the CMD box, along with a delay time to wait before sending the command to the network device under test. The restore command can be used to return the network device under test to an initial condition after a test is performed. For example, the command logout can be entered to log out of the telnet session to the network device under test.

When the add button is pressed, the restore command is listed in list box 84. A restore command in list box 84 can be selected and modified or deleted by pressing the modify or delete buttons on active sub-tab 86. Other commands can be added to restore values in the network device. For example, when the command "speed 10" was entered as a high-level command in FIG. 8 to test for configuring a 10 Mbits-persecond (mbps) mode, then the default 100 mbps mode can be restored by specifing the command "speed 100" as one of the restore commands. Other manufacturers of network devices may require a sequence of restore commands, such as the 4-command sequence: "conf t", "int e24", "speed 10-half", and "end".

Figure 11:
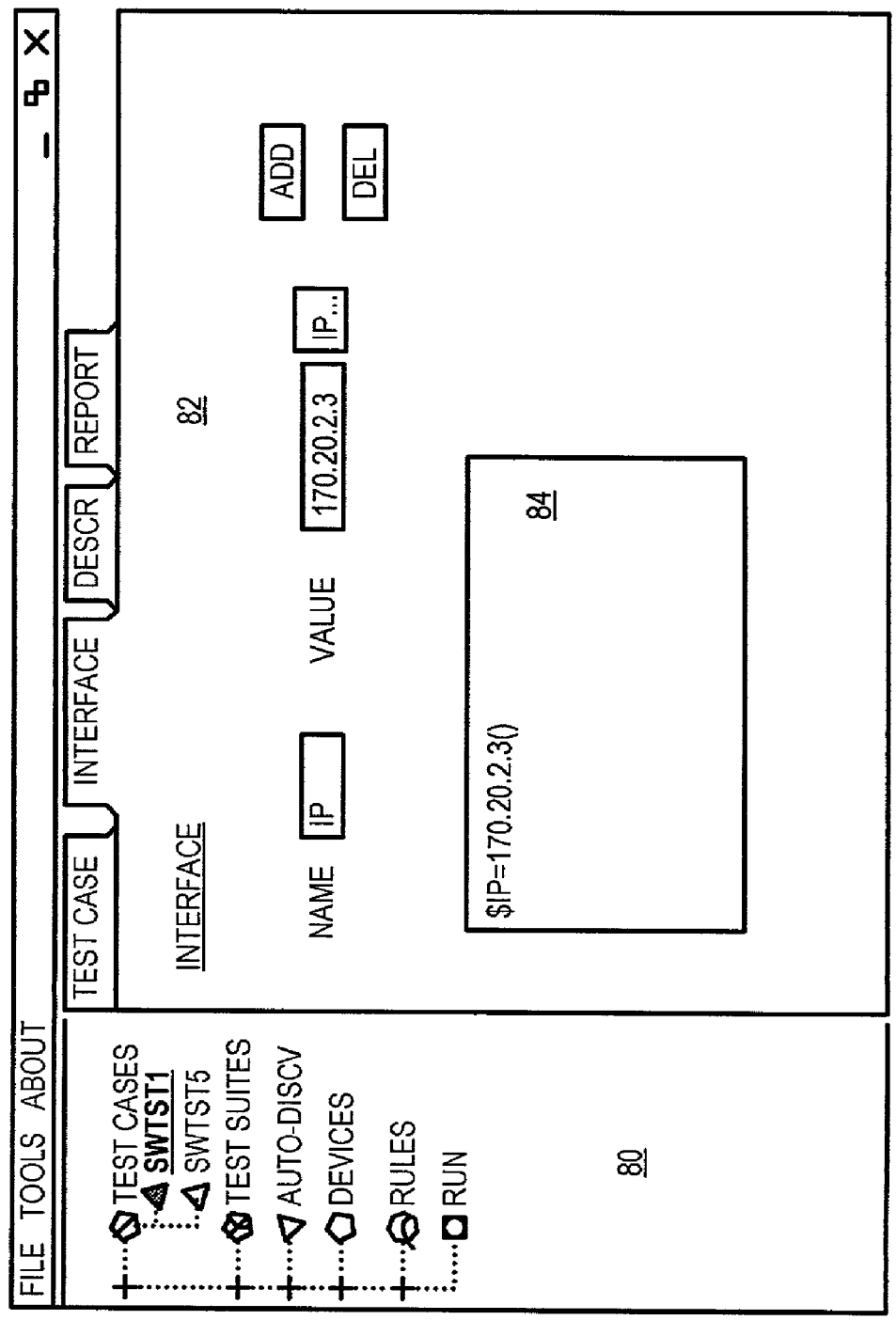
FIG. 11 shows a graphical-user-interface to specify an address interface to a network device under test.

FIG. 11 shows a graphical-user-interface to specify an address interface to a network device under test. In the test case, when the user clicks on the interface tab at the top of active sub-tab 86, the interface tab is displayed as shown in FIG. 11. The user types in a name for the interface address, such as IP. The value of the IP address is entered into the value box. Alternately, the user can press the IP . . . button and select the IP address from a list of addresses in a pop-up window. Clicking on the add button causes the IP address value to appear in list box 84. Passing of parameters can be supported by prefixing the IP address value with a dollar sign. More than one interface can be listed, such as for multiple ports on a single switch being tested. The description tab can be selected to allow the user to add a description for the test case, and perhaps a revision history or other notes.

Figure 12:
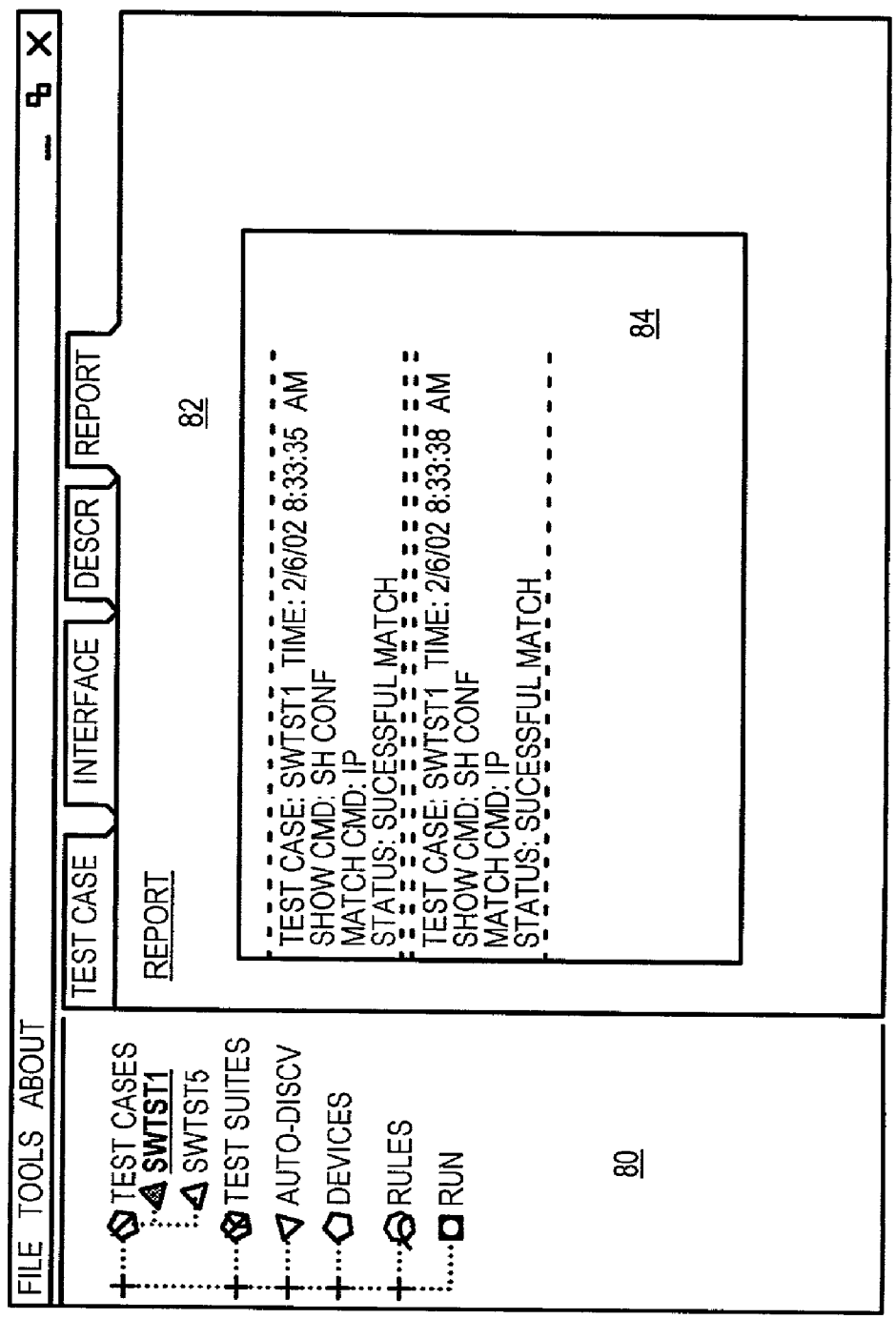
FIG. 12 shows a report from running a test case.

FIG. 12 shows a report from running a test case. When the user clicks on the run button on the test case tab of FIGS. 8–10, the test manager uses the prompts in the rules to determine when to send the passwords and other shell commands to the network device under test. The commands specified in the commands tab, and the analyze and restore commands are then transmitted to the network device under test. A report is generated by the test run executer and monitor. This report can be displayed in the user interface on the report tab.

In this example the test case SWTST1 was executed twice, since a repeat of 2 was specified in FIG. 10. The analyze command and its result are displayed in the report window (list box 84) on active tab 82. The show command sh conf reads the configuration of the network device. The status result was a successful match both times.

Figure 13:
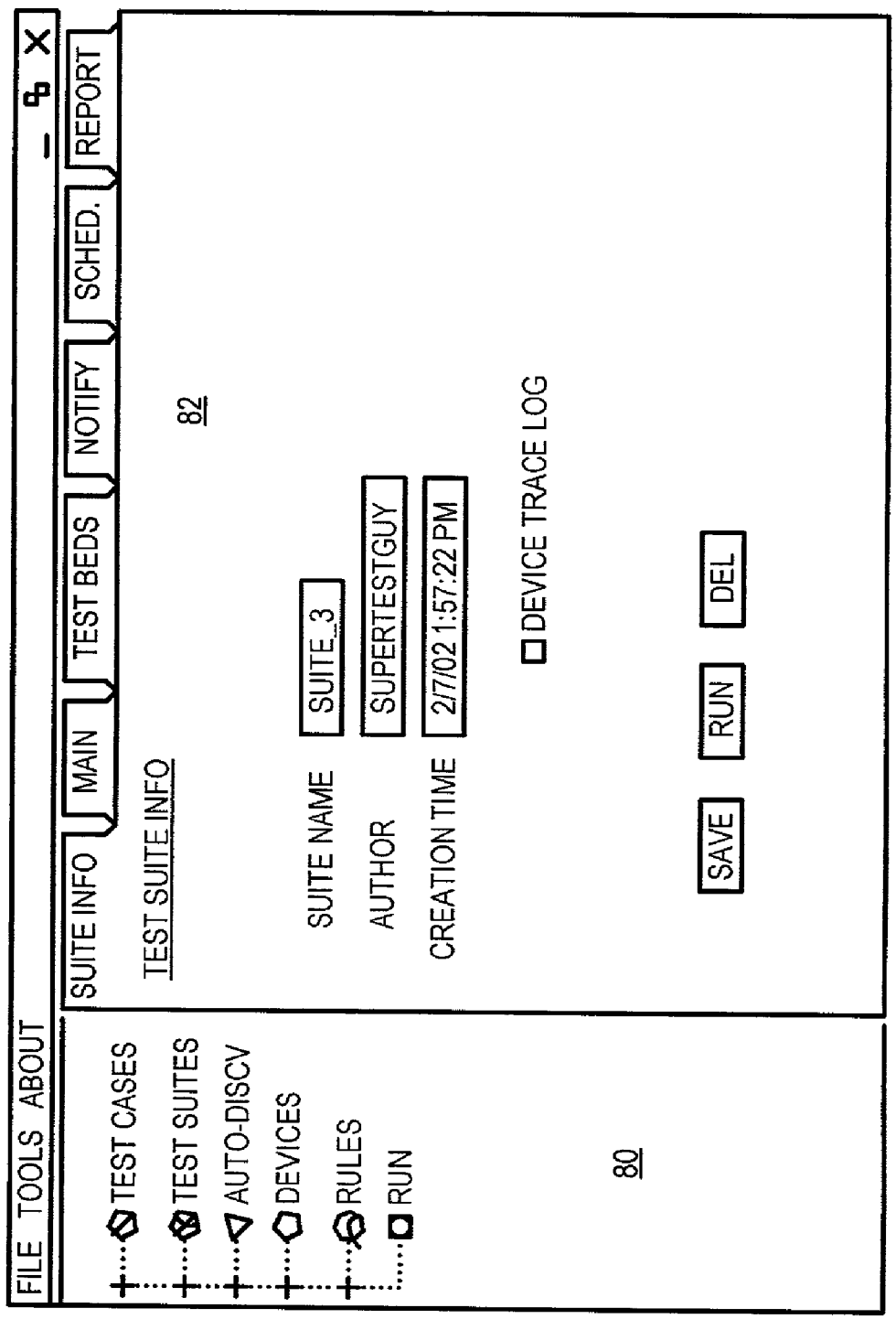
FIG. 13 is an interface for specifying a test suite.

FIG. 13 is an interface for specifying a test suite. A test suite is a collection of many test cases executed in a sequence on the network device under test. When the user clicks on the test suite node in tree-view area 80, or uses the menus or shortcuts to navigate to the test suite interface, the test suite information can be entered into text-entry boxes in active tab 82. The suite name and author can be typed in, and the creation date is automatically entered by the test manager software. A device trace log can be selected for the entire test suite by clicking the check box. The test suite is saved using the save button, or modified or deleted using the appropriate buttons on active tab 82. When the test suite is saved, it appears as a child node under the test suite node in tree-view area 80 as shown in FIG. 14.

Figure 14:
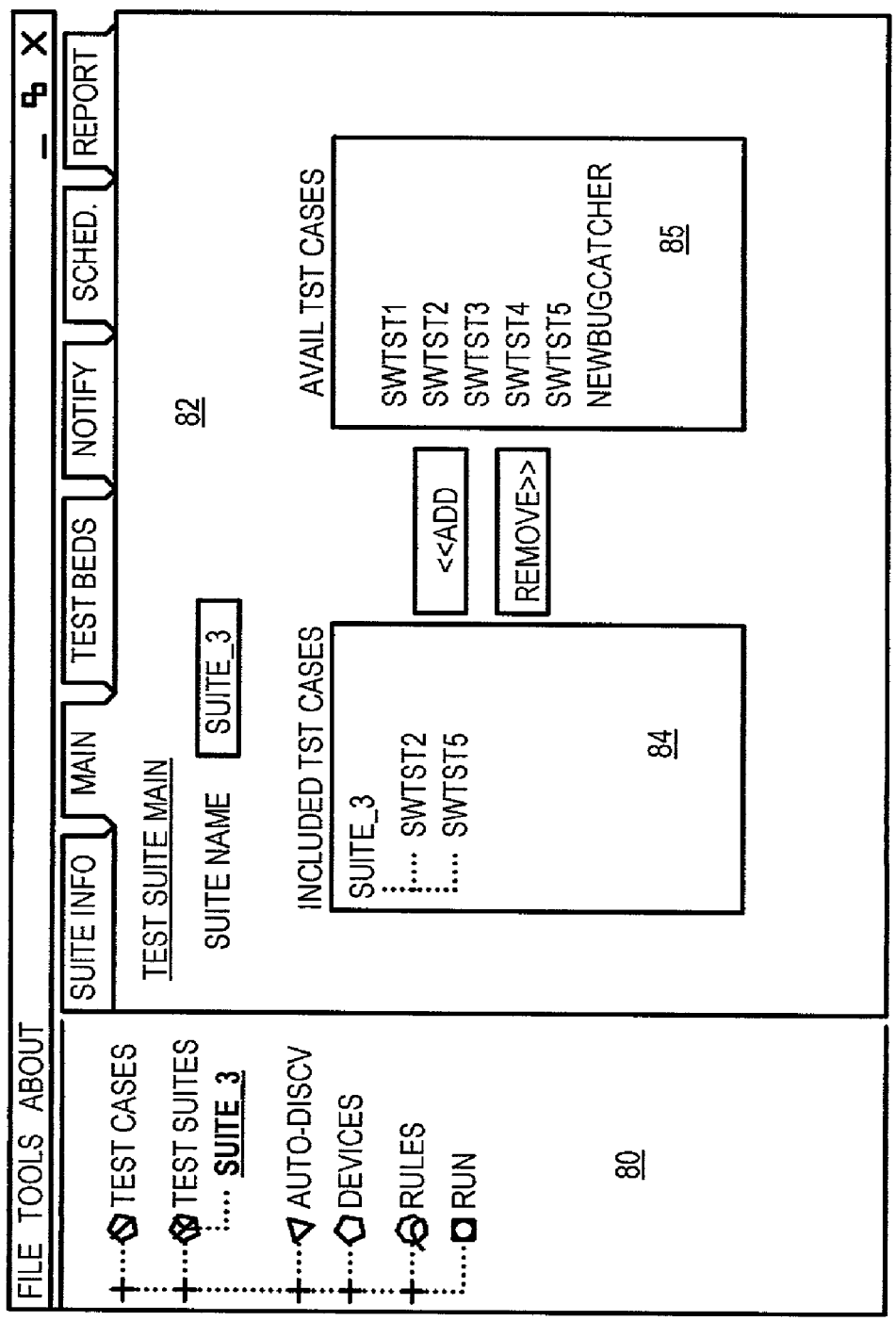
FIG. 14 is an interface for specifying test cases in a test suite.

FIG. 14 is an interface for specifying test cases in a test suite. When the main tab is pressed, active tab 82 allows the user to specify which test cases to include in the current test suite. The test suite name is displayed by the test manager, and can be edited in some embodiments on this tab, or may be read-only in other embodiments.

The user selects one or more test cases listed in the right list box 85, and clicks on the "<<add" button to have these test cases added to the list of test cases included in the current test suite that are listed in left list box 84. Test cases displayed in left list box 84 can be removed from the test suite by selecting them in list box 84 and clicking the "remove>>" button. Right list box 85 can list just those test cases that are not already included in the test suite, or it can list all test cases. Double-clicking or right clicking can also be used to add or remove test cases.

Figure 15:
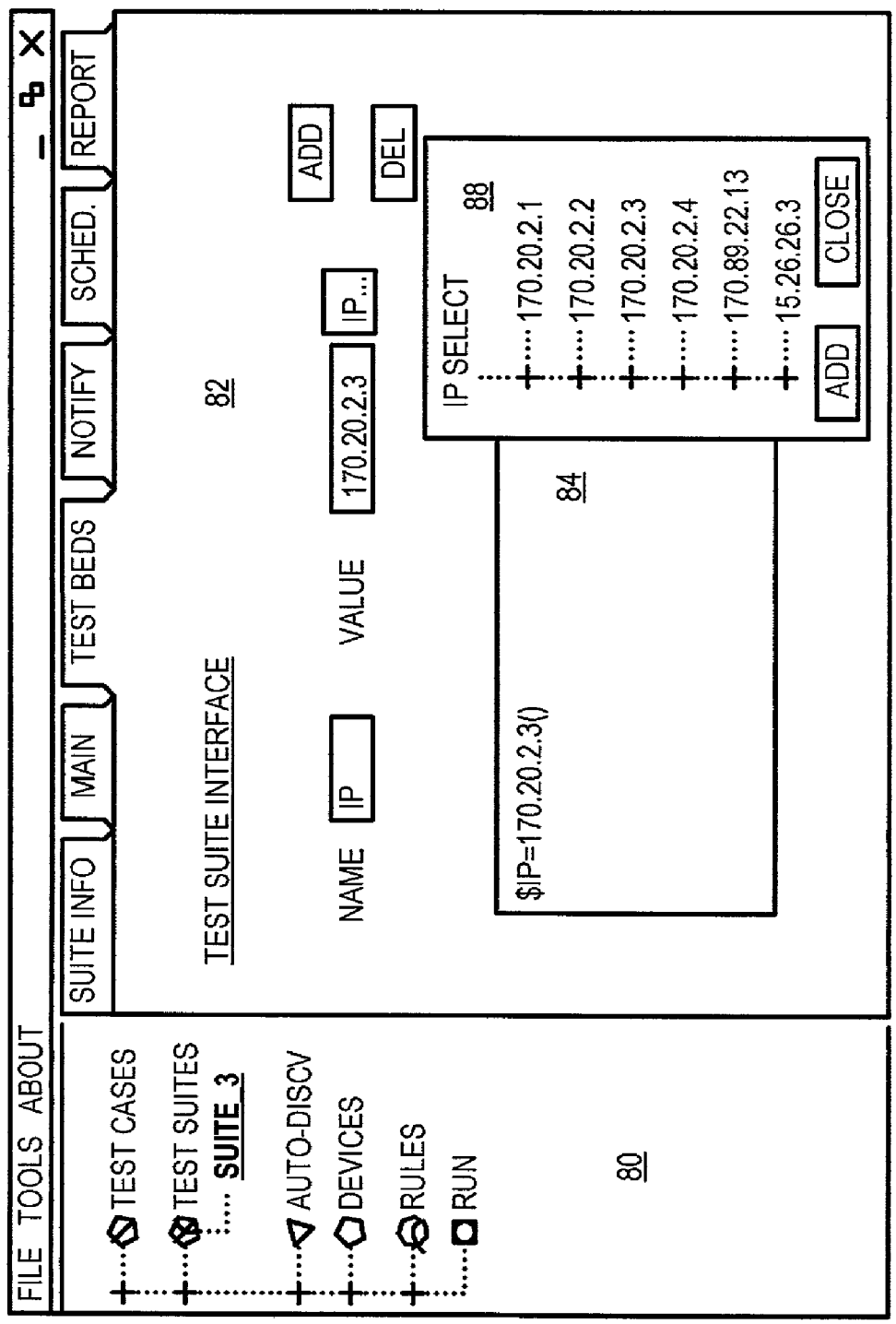
FIG. 15 shows an interface to specify the test bed.

FIG. 15 shows an interface to specify the test bed. The test bed specifies an address interface to one or more network devices under test. In the test suite, when the user clicks on the test-bed tab at the top of active sub-tab 86, the test-bed tab is displayed as shown in FIG. 15. The user types in a name for the interface address, such as IP, RS-232, General-Purpose Interface Bus (GPIB), Digital Interface Input/Output (DI/O), etc. The value of the IP address is entered into the value box. Alternately, the user can press the IP . . . button and select the IP address from a list of addresses in pop-up window 88. Clicking on the add button causes the IP address value to appear in list box 84. The interface is specified here to allow the test suite to be run on multiple network devices.

Figure 16:
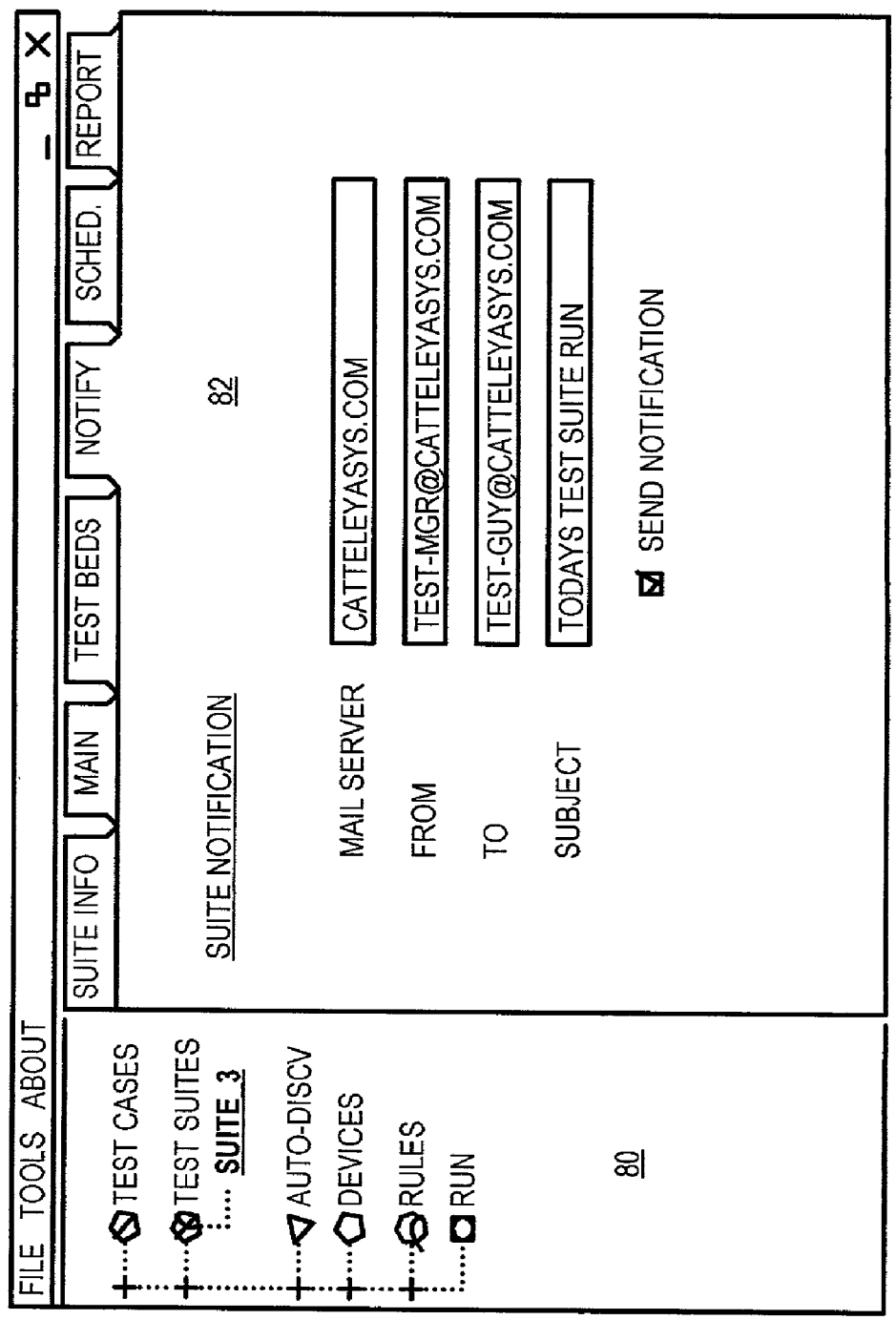
FIG. 16 shows a notification interface to the test manager.

FIG. 16 shows a notification interface to the test manager. The user can specify that a notification email be sent once the test suite is executed by clicking the send notification check-box. The user clicks on the notify tab and enters email addresses of recipients in the to: box, and a mail-subject in the subject box. The mail server and from: fields can also be specified, or these can be defaults set during installation of the test manager software. Other notification methods such as an instant message, a pager or cell-phone text message, or an audible alarm could be supported in some embodiments.

Figure 17:
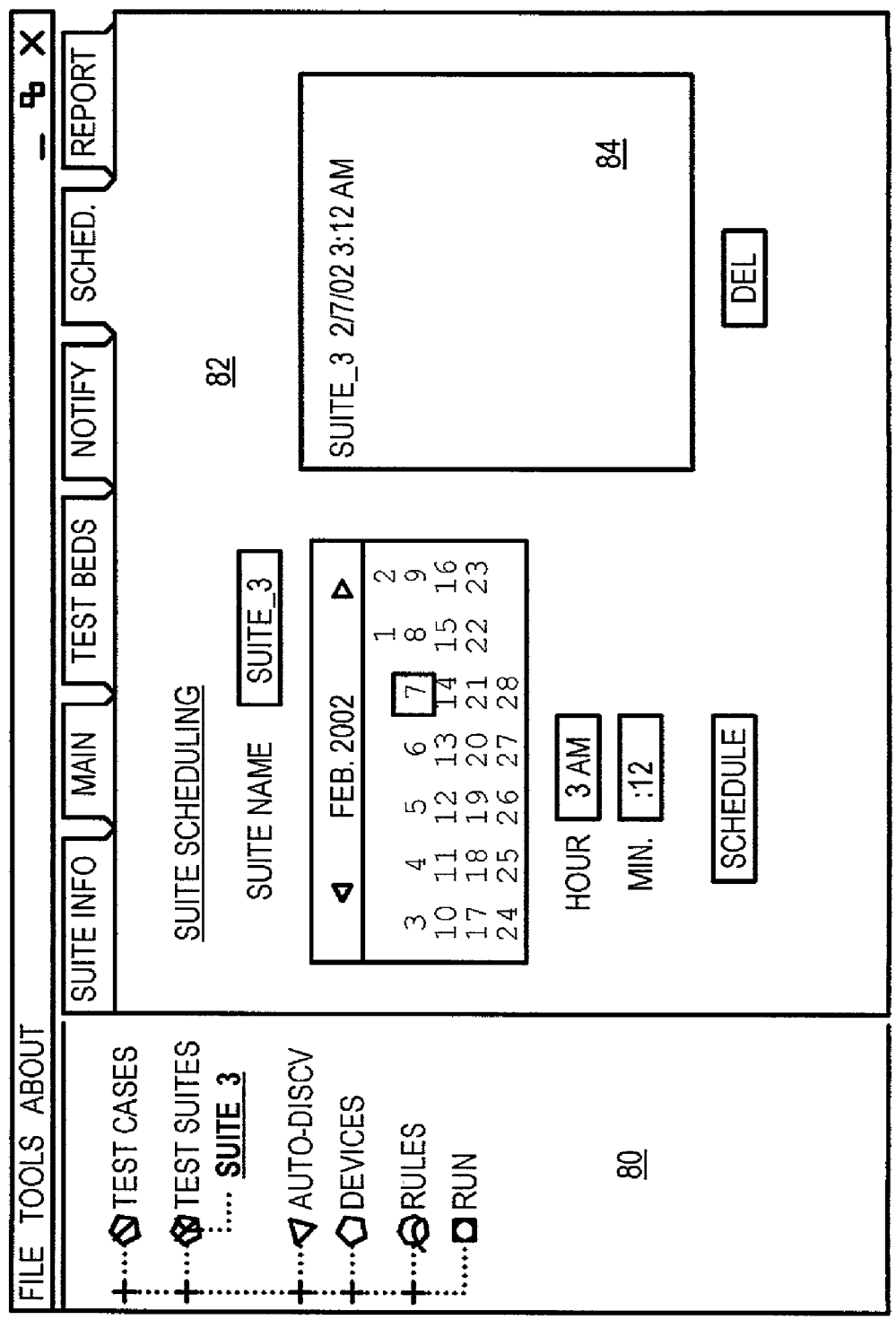
FIG. 17 shows a scheduling interface.

FIG. 17 shows a scheduling interface. The user can specify a future time for the test suite to be executed, such as during the nighttime when a test system may be unused by production. The date can be selected from a calendar displayed, or typed in for other embodiments. The time for test-run execution can also be typed in. Clicking on the schedule button schedules the current test suite for execution at the specified day and time listed in list box 84. Multiple executions can be scheduled at different times.

A test suite can also be executed using the run node in tree-view area 80, or a run command in the tool menu, or a keyboard shortcut. Running test suites can be stopped from the run node in tree-view area 80. The report tab in the test suites interface can also be used to display results when a test suite is run immediately.

Figure 18:
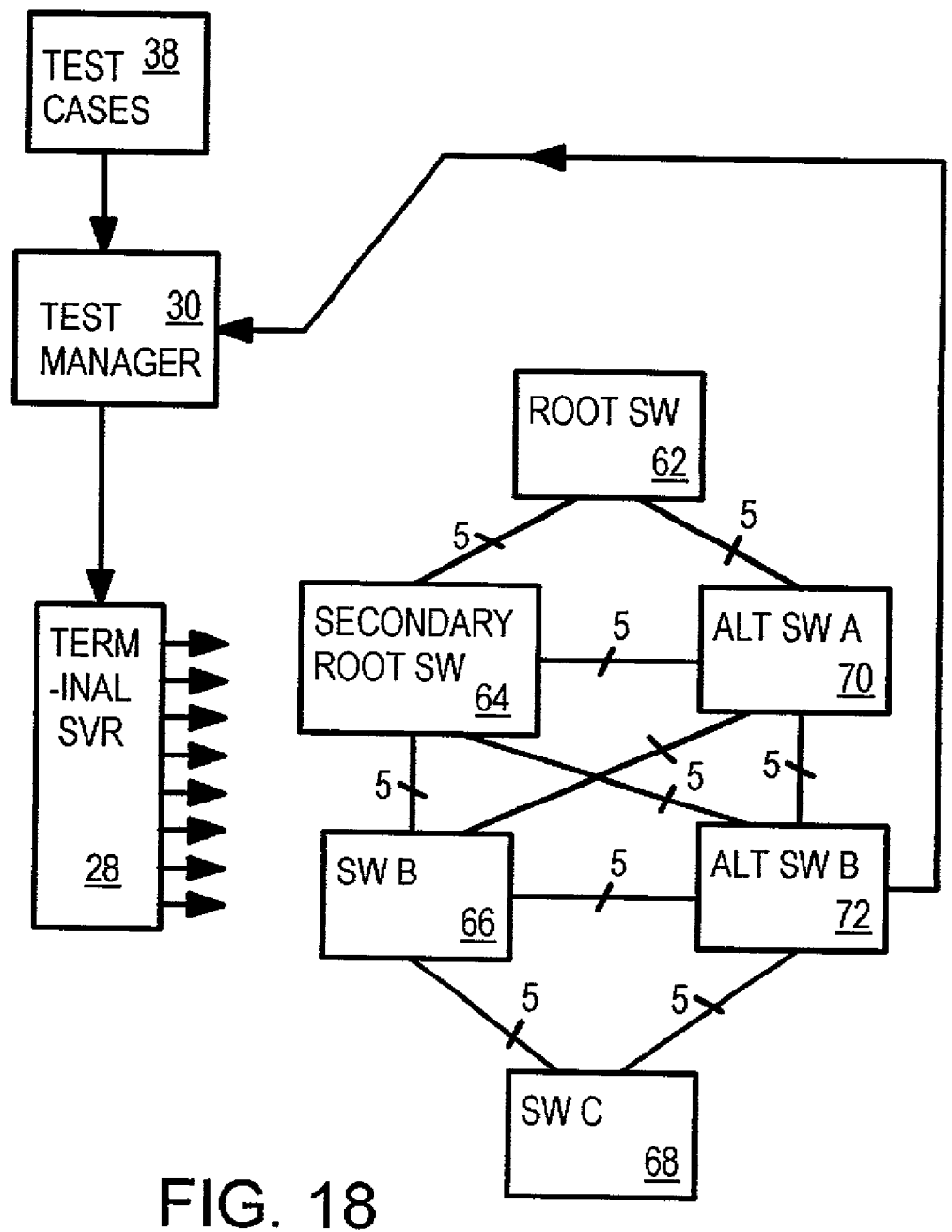
FIG. 18 is a diagram of a more complex test bed of network switches being tested.

FIG. 18 is a diagram of a more complex test bed of network switches being tested. Test cases 38 are written by a test engineer using the test GUI. Test manager 30 sends commands from test cases 38 to terminal server 28, which directs the commands to one or more ports of the six switches in the test bed. Terminal server 28 gives the user console login access to the six different switches. Each of switches 62, 64, 66, 68, 70, 72 can have a different number of ports, such as 12, 24, or 48. In the test bed, five individual trunks are formed between each between pair of switches. Each trunk has at least two ports. For example, ten ports of switch 62 connect to ten ports of switch 64, and another ten ports of switch 62 connect to ten ports of switch 70. The network topography of the test bed is to check for convergence of the switches using a specific protocol which ensures and produces result that the network converges at a point where N number of virtual local-area-network (vlan) configurations is added to the network. The network convergence is measured by the output that is being generated when the traffic generator produces traffic. The output is compared by the test manager for the values and the test manager makes a decision if the network has converged or not. Accordingly, the test manager continues or terminates depending on the output generated from the traffic generator. The traffic generator is hardware use to send traffic patterns to the switches. The traffic generator is connected to one of the ports of switch 72. The traffic generator generates traffic based on a pattern setup in a TCL/TK script.

Alternate Embodiments

Several other embodiments are contemplated by the inventors. For example the test GUI can be produced by a variety of software programming languages and tools, either using low-level instructions such as C++ statements, or using calls to higher-level macros or subroutines in a library such as an applications-programming interface (API). Often a combination of API's, macros, and custom programming is used. The components of the invention can be partitioned in a wide variety of combinations and databases may be separate or parts of a larger storage unit. Alternate interfaces can be supported, such as suing the menus or shortcut keys or right-clicking with a mouse.

The user interface can differ in appearance from the simplified diagrams used to illustrate the concepts of the invention. The user interface may be customizable and appear different on different machines, environments, and operating systems. While IP addresses have been illustrated, other kinds of network addresses could be substituted, such as media-access-controller (MAC) addresses, Token-ring or Ethernet addresses, physical or virtual addresses, etc. Dynamic rather than static addresses could be used. Then a rule for generating the dynamic address may replace the static address.

While CLI/telnet has been described as an interface between the test manager and the network device under test or any terminal server, other interfaces could be substituted. For example, hyper-text transfer protocol (HTTP) could be used as the interface, with commands sent using a markup language such as extensible markup language (XML). A serial interface such as RS-232 could also be used. A variety of prompts and formats for prompts can be generated by different network devices. In addition to SNMP, other test and communication protocols can be used, such as Man-Machine language (MML), GPIB, DI/O, and guidelines for definition of management objects (GDMO).

Multiple test suites can be developed, each containing a sequence of test cases. Test cases or suites can be repeated, re-used, or shared. Conditional commands can be included to conditionally execute commands, test cases or suites. Export and import of test cases and suites can be supported by the test manager, and report and log viewers can be called by the test manager. The test GUI can easily be extended to add new features and can run on personal computers, Unix workstations, and other machines. The test suites can be used for development testing, functional, regression, environmental, and manufacturing testing as well as quality-assurance testing. Commands from the test manager can be sent to other test equipment such as environmental controls, test-vector generators and analyzers, etc.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A test manager system comprising:
a test graphical-user-interface (GUI) that enables a user to enter high-level commands to test one or more newly manufactured network devices;
a test executer, coupled to the test GUI and sending the high-level commands to a selected network device, the test executer receiving status values from the selected network device and analyzing the status values by comparing the status values to acceptable ranges of status values to determine when the selected network device has failed a test;
a rules database that stores logon prompts generated by the selected network device, the test executer connecting to the selected network device by receiving matching prompts from the selected network device and responding with user values input by the user to the test GUI, the user input values being sent to the selected network device in response to the matching prompts in a sequence defined by the user using the test GUI; and
a report generator, responsive to the test executer, for generating a test-results report to the user, the test-results report indicating when the test executer determines that the selected network device has failed the test;
wherein the test executer logs on to the network device by sending the user input values in the sequence defined by the user in response the to matching prompts that match logon prompts in the rules database, the test executer also sending the high-level commands to the selected network device and receiving and analyzing the status values to determine when the selected network device has failed the test, whereby the selected network device is tested using high-level commands.

2. The test manager system of claim 1 wherein the test GUI receives the high-level commands from the user in a command-line interface (CLI) format, the high-level commands being sent to the selected network device using the CLI when the test executer tests the selected network device, whereby a CLI is used to receive the high-level commands from the user, and to send the high-level commands to the selected network device.

3. The test manager system of claim 2 wherein the high-level commands include CLI commands to show and set configuration setting including a configured speed of a port of the selected network device.

4. The test manager system of claim 2 wherein the high-level commands include Simple Networking Management Protocol (SNMP) commands that read status values from a management database on the selected network device, whereby the user enters SNMP commands to test the selected network device.

5. The test manager system of claim 2 wherein the test GUI stores the high-level commands in a plurality of test cases, each test case having at least one high-level command, at least one analyze command, while at least some test cases also include a restore command that restores the selected network device to a predetermined state that existed before the high-level command in the test case was executed by the selected network device, whereby the high-level commands are arranged into test cases.

6. The test manager system of claim 5 wherein the restore command is a command to logout from the selected network device or a command to reset a configuration of a port on the selected network device.

7. The test manager system of claim 5 wherein at least one of the test cases include a link to the rules database to specify a sequence of logon prompts and user input values for logging on to the selected network device, whereby at least one test case identifies a logon sequence, a high-level command, and an analyze command.

8. The test manager system of claim 5 wherein the test GUI arranges the plurality of test cases into at least one test suite, the test suite defining a sequence of the test cases to execute to test the selected network device, whereby lower-level test cases are arranged into higher-level test suites.

9. The test manager system of claim 1 wherein the rules database includes dual-level logon sequences that first logs on to a console level of the selected network device, then logs on to an enable level or a supervisor level of the selected network device; wherein the enable level or the supervisor level allows high-privilege commands to be executed while the console level does not allow high-privilege commands to be executed, whereby two levels of logon are performed by the test executer.

10. The test manager system of claim 1 further comprising: a network address database that stores network addresses of the selected network device and other network devices in a test network; wherein a test case includes an identifier of a network address for the selected network device, the test executer logging on to the selected network device and sending the high-level commands using the network address from the network address database.

11. The test manager system of claim 10 further comprising: a test-bed address re-mapper, coupled to the network address database, for replacing a network address of the selected network device with a new network address to test other network devices.

12. The test manager system of claim 11 wherein the test-bed address re-mapper further modifies the logon prompts from the rules database to match with matching prompts from the other network devices, whereby logon prompts are modified for testing other network devices.

13. The test manager system of claim 10 wherein the network address is an Internet Protocol (IP) address.

14. The test manager system of claim 13 wherein the selected network device is a network switch or a network router having at least 24 ports.

15. A computer-implemented device testing method comprising:
providing a network device under test from one or more newly manufactured network devices;
using a test graphical-user-interface (GUI) to receive expected prompts from a user, the expected prompts being prompts generated by the network device under test;
displaying the expected prompts in a window in the test GUI in a logon sequence order;
storing the expected prompts and the logon sequence order as a logon rule;
associating the logon rule with the network device under test;
entering into the test GUI user replies to the expected logon prompts for the logon rule;

creating a test case by entering into the test GUI a high-level command for transmission to the network device under test using a command-line interface (CLI);

specifying an analysis command using the test GUI by identifying a CLI command to read a configuration setting that was set by the high-level command and to compare the configuration setting to an expected configuration setting;

associating the test case with a network address for the network device under test;

executing the test case by activating an automated test program that uses the logon rule to connect to the network device under test, and sending the high-level command to the network device under test, and analyzing results of execution of the high-level command to determine when the network device under test has failed the test case; and reporting results of execution of the test case that includes a failure indication when the network device under test has failed the test case, whereby the network device under test is automatically tested using a high-level CLI interface.

16. The computer-implemented method of claim 15 further comprising:

generating other test cases for the network device under test;

for at least one test case, specifying a restore command or a logout command to be executed after the analysis command, to return the network device under test to a predetermined state;

assembling the test cases into a test suite;

executing the test suite by executing each test case in the test suite in a test order, whereby a test suite of test cases is automatically executed.

17. The computer-implemented method of claim 15 wherein at least some of the high-level commands are Simple Networking Management Protocol (SNMP) commands;

further comprising:

sending the SNMP commands to the network device under test;

receiving from a management agent in the network device under test a status value from a management information database in the network device under test that indicates a status of the network device under test after executing the high-level command from the test case, whereby the network device under test is automatically tested using high-level SNMP commands.

18. The computer-implemented method of claim 17 further comprising:

scheduling execution of the test case at a future date and time by specifying a date and time using the test GUI;

entering a notification address using the test GUI;

activating an automated test program at the future date and time specified;

generating a report of results of execution of the test case;

sending the report to the user by e-mail or by text messaging to the notification address, whereby the test case is automatically executed and the user automatically notified of test execution.

19. A computer readable program tangibly embodied on a computer program product comprising:

means for testing one or more newly manufactured network devices;

network connection means for transmitting and receiving packets from a network device under test;

test graphical-user-interface (GUI) means for:

receiving high-level commands, logon sequences, and scheduling information from a user, the high-level commands including Simple Networking Management Protocol (SNMP) commands to read status data from a management information base in the network device under test; and storing in a rules database, logon sequences that match logon sequences generated by the device under test; and execute means, activated in response to the scheduling information entered by the user with the test GUI, for connecting to the network device under test with a telnet session using the logon sequences, and for sending the high-level commands to the network device under test for execution by the network device under test; and monitor and report means, activated by the execute means, for analyzing execution results from the network device under test and for generating a report of execution results, whereby high-level SNMP commands are sent to the network device under test after connecting to the network device under test using the logon sequences.

20. The computer-program product of claim 19 wherein the test GUI further comprises: a tree-view area containing nodes for activating windows of the test GUI for listing and modifying test information on network devices, test sequences, and logon sequences;

an active tab window for viewing and modifying a portion of the test information;

an active sub-tab window for entering the high-level commands, wherein the active tab window and the active sub-tab window change display appearance for different test information, whereby the test GUI changes display appearance for entering different test information.

* * * * *

UNITED STATES PATENT AND TRADEMARK OFFICE
CERTIFICATE OF CORRECTION

PATENT NO. : 7,010,782 B2 Page 1 of 1
APPLICATION NO. : 10/063267
DATED : March 7, 2006
INVENTOR(S) : Narayan et al.

It is certified that error appears in the above-identified patent and that said Letters Patent is hereby corrected as shown below:

in Claim 1 on column 13, line 36, change

"response the to matching"

to

--response to matching--.

Signed and Sealed this

Sixth Day of May, 2008

JON W. DUDAS
*Director of the United States Patent and Trademark Office*